United States Patent Office 3,573,994
Patented Apr. 6, 1971

3,573,994
LIQUID PERMEABLE LIQUID ABSORBENT
POROUS SHEET MATERIALS
Braham Rowley Field, Redditch, England, assignor to
Alkaline Batteries Limited, Redditch, England
No Drawing. Filed Jan. 31, 1968, Ser. No. 701,856
Int. Cl. H01m 3/02; B32b 5/16
U.S. Cl. 136—145                                    5 Claims

ABSTRACT OF THE DISCLOSURE

A material suitable for use in separators for the plates of alkaline storage batteries is made by sintering a felt containing about 90% fibre and 10% powder, of which about half the fibre is nylon staple and about half regenerated cellulose, and of which about a third of the powder is powdered nylon, the remainder being cellulose powder and inert filler powder.

---

This invention relates to liquid permeable liquid absorbent porous sheet materials for use as a separator in an electric storage battery employing an alkaline electrolyte.

According to the present invention a liquid permeable liquid absorbent porous sheet material, for use as a separator in an electric storage battery employing an alkaline electrolyte, comprises a major portion of fibres randomly arranged in a compact non-woven mat, of which at least half are of a thermoplastic polymeric plastics material while the remainder comprise cellulosic fibres, and, distributed through the fibres, a minor portion of finely divided filler powder, at least a part of which is constituted by a thermoplastic polymeric plastics powder, the thermoplastic constituents being sintered. The non-woven mat of fibres may include 50–80% by weight of thermoplastic fibres and 50–20% by weight of cellulosic fibres. The thermoplastic fibres may include nylon fibres, for example staple fibres, while the cellulostic fibres may be regenerated cellulostic fibres.

The portion of filler powder preferably amounts to 5–20% by weight of the portion of fibres.

The thermoplastic constituent of the filler powder may include nylon powder. The filler powder may also include cellulosic material in powder form, in which case equal parts of thermoplastic and cellulosic powders may be used.

The filler powder may also include an inert powder which is insoluble in the alkaline electrolyte, for example barium sulphate powder or titanium dioxide powder, in which case the ratio of the weight of thermoplastic powder plus cellulosic powder to the weight of inert powder may be from 1:1 to 7:3, but is preferably 1:1.

According to a further aspect of the present invention, a method of making a sheet material as hereinbefore described comprises passing the blended constituents therefor between a pair of heated rolls at such a temperature and at such a speed as to sinter the thermoplastic constituents. When the thermoplastic constituents include nylon, a convenient roll temperature is 160° C. and a convenient speed is 10 feet per minute.

The sheet material formed by sintering from the particular combination of fibres and powders specified in accordance with the invention has a particularly homogeneous structure which is a considerable improvement on cellulose-based separators made by normal paper making techniques. Moreover, cellulose is normally and eventually degraded by alkaline electrolyte but, in the material described, it is found that it remains undamaged over a long life test in alkaline electrolyte. While the invention is not dependent on any particular theory, it is thought possible that the thermoplastic materials may, to some extent, shield the cellulosic materials from the action of the electrolyte and in any event impart strength to the complete material. At the same time, due to the cellulosic constituents, the material provides a high degree of absorbency at an acceptable cost.

Further features and details of the invention will be apparent from the following description, given by way of example, of one specific embodiment as applied to a material suitable for use as a separator suitable for use in an electric storage battery which uses an alkaline electrolyte.

The separator described is particularly suitable for use in potassium hydroxide electrolyte.

The constituents of the separator are as follows:

45% by weight of nylon staple fibre 0.18 mm. in diameter and 4 mm. long
45% by weight of regenerated cellulose staple fibre 0.13 mm. in diameter and 2 to 4 mm. long
2½% by weight of 100 mesh (British Standard) nylon powder
2½% by weight of 100 mesh (British Standard) regenerated cellulose powder
5% by weight of 100 mesh (British Standard) titanium dioxide powder These constituents are thoroughly blended and formed, by conventional paper making techniques, into a sheet of soft fibrous paper-like material, somewhat thicker than the finally required thickness of 0.21 mm. This sheet is dried and then passed between a pair of heated rollers which reduces its thickness to the desired value of 0.21 mm.

The temperature of the heated rolls and the rate at which the sheet passes through their nip is such that the nylon fibres become softened and sintered to each other at their points of contact whilst at the same time the regenerated cellulose is not degraded to any disadvantageous degree. A roll temperature of 160° C. and a rate of travel through the nip of the rolls of 10 feet per minute have been found to be suitable for the composition quoted above.

The separator material in the dry state weighs 90 grams per square metre and has a void volume of 147 cc./sq. metre or 70%.

After soaking in 12 N potassium hydroxide solution for twenty-four hours the material undergoes a 52% increase in thickness.

Electrolyte retention is 42% when measured as follows: The material 5 cm. x 5 cm. is immersed in electrolyte under vacuum. It is then weighed and placed between two plates of sintered nickel each 5 cm. x 5 cm. x 0.038 inch thick and a 10 gram weight is placed on the upper plate. The material is reweighed after 10 minutes.

What I claim as my invention and desire to secure by Letters Patent is:

1. A liquid permeable, liquid absorbent porous sheet material, for use as a separator in an electric storage battery employing an alkaline electrolyte, comprising 80 to 95%, by weight, of fibres randomly arranged in a compact non-woven mat, of which fibers 50 to 80%, by weight, are of a thermoplastic polymeric plastics material at least part of which is nylon staple fibre, while the remaining 50 to 20%, by weight of the fibres, comprise regenerated, cellulosic fibres; and, distributed through the fibres 20 to 50%, by weight of the sheet material, of finely divided filler powder, at least a part of which is constituted by a thermoplastic polymeric plastics powder, which includes nylon powder, and cellulosic material in powder form, the thermoplastic constituents being sintered.

2. A sheet material as claimed in claim 1 in which, in the filler powder, equal parts of thermoplastic and cellulosic powders are used.

3. A sheet material as claimed in claim 1 in which the filler powder also includes an inert powder which is either barium sulphate powder or titanium dioxide powder.

4. A sheet material as claimed in claim 3 in which, in the filler powder, the ratio of the weight of thermoplastic powder plus cellulosic powder to the weight of inert powder is from 1:1 to 7:3.

5. A sheet material as claimed in claim 4 in which, in the filler powder, equal parts of theremoplastic powder plus cellulosic powder and inert powder are used.

References Cited

UNITED STATES PATENTS

| 2,591,755 | 4/1952 | Wilson et al. | 136—145 |
| 3,238,056 | 3/1966 | Pall et al. | 136—145 |
| 3,272,656 | 9/1966 | Corbin et al. | 162—146 |
| 3,340,100 | 9/1967 | Silvestri | 136—146 |
| 3,354,052 | 11/1967 | Sommer et al. | 162—146 |
| 3,386,231 | 4/1968 | Nutting | 162—146 |
| 3,401,078 | 9/1968 | Grossteinbeck et al. | 162—146 |

ROBERT F. BURNETT, Primary Examiner

R. O. LINKER, Jr., Assistant Examiner

U.S. Cl. X.R.

136—146; 161—158, 170; 162—146

UNITED STATES PATENT OFFICE
CERTIFICATE OF CORRECTION

Patent No. 3,573,994          Dated April 6, 1971

Inventor(s)   Braham Rowley Field

It is certified that error appears in the above-identified patent and that said Letters Patent are hereby corrected as shown below:

Between lines 3 and 4 in the heading, after "SN 701856" inse

--Claims priority, British application No. 7359/67, filed February 15, 1967.--

Signed and sealed this 25th day of April 1972.

(SEAL)
Attest:

EDWARD M. FLETCHER, JR.                ROBERT GOTTSCHALK
Attesting Officer                      Commissioner of Patents